(12) United States Patent
Dumitru et al.

(10) Patent No.: US 9,403,565 B2
(45) Date of Patent: Aug. 2, 2016

(54) TRACK PIN RETENTION SYSTEM AND METHOD

(75) Inventors: Mircea Dumitru, Washington, IL (US); Thomas John Yaniak, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 797 days.

(21) Appl. No.: 13/568,652

(22) Filed: Aug. 7, 2012

(65) Prior Publication Data

US 2014/0042802 A1 Feb. 13, 2014

(51) Int. Cl.
  *B62D 55/32* (2006.01)
  *B62D 55/21* (2006.01)
  *B21L 9/06* (2006.01)
  *F16G 15/06* (2006.01)

(52) U.S. Cl.
  CPC .............. *B62D 55/21* (2013.01); *B21L 9/065* (2013.01); *B62D 55/32* (2013.01); *F16G 15/06* (2013.01); *Y10T 29/49833* (2015.01); *Y10T 29/49908* (2015.01); *Y10T 29/49938* (2015.01); *Y10T 29/49945* (2015.01); *Y10T 29/49954* (2015.01)

(58) Field of Classification Search
  CPC ........ B62D 55/21; B62D 55/32; B21L 9/065; Y10T 29/49908; Y10T 29/49833; Y10T 29/49938; Y10T 29/49945; Y10T 29/49954; F16G 15/06
  See application file for complete search history.

(56) References Cited

U.S. PATENT DOCUMENTS

| | | |
|---|---|---|
| 2,881,646 A | 4/1959 | Farr et el. |
| 3,444,606 A | 5/1969 | Jones |
| 4,222,616 A | 9/1980 | Brewer |
| 4,612,765 A | 9/1986 | Livesay |
| 4,618,190 A | 10/1986 | Garman et al. |
| 4,628,874 A | 12/1986 | Barlow |
| 4,639,995 A | 2/1987 | Garman et al. |
| 5,099,807 A | 3/1992 | Devine |
| 5,183,318 A | 2/1993 | Taft et al. |
| 5,201,171 A | 4/1993 | Anderton et al. |
| 5,257,858 A | 11/1993 | Taft |
| 5,385,124 A | 1/1995 | Hillebrand et al. |
| 5,887,958 A | 3/1999 | Bissi et al. |
| 6,270,173 B1 | 8/2001 | Hashimoto et al. |
| 6,457,304 B1 | 10/2002 | Bedford et al. |
| 6,564,539 B2 | 5/2003 | Bedford et al. |
| 6,612,663 B2 | 9/2003 | Hashimoto et al. |
| 6,886,323 B2 | 5/2005 | Yamamoto |
| 2001/0003895 A1 | 6/2001 | Bedford et al. |
| 2003/0001433 A1 | 1/2003 | Anderton |
| 2003/0101711 A1 | 6/2003 | Yamamoto |
| 2008/0016840 A1* | 1/2008 | Tyroller ........................ 59/12 |

* cited by examiner

*Primary Examiner* — John C Hong

(74) *Attorney, Agent, or Firm* — Finnegan, Henderson, Farabow, Garrett & Dunner, LLP

(57) ABSTRACT

The disclosure may provide a method of forming a track assembly. In the method, a track pin may be disposed within a first through hole of a first track link and within a second through hole of a second track link. A force may be applied to a tool positioned in a first position to plastically deform a first portion of the first track link which surrounds the first through hole, to thereby form a first connection between the track pin and the first track link. A force may be applied to the tool positioned in a second position to plastically deform a second portion of the first track link which surrounds the first through hole, to thereby form a second connection between the track pin and the first track link. The second connection may be formed after the first connection.

15 Claims, 4 Drawing Sheets

TRACK PIN RETENTION SYSTEM AND METHOD

TECHNICAL FIELD

The present disclosure relates generally to a track assembly for a mobile machine and, more particularly, to a system and a method of retaining a track pin within a track link of the track assembly.

BACKGROUND

A track-type mobile machine may include track assemblies on both the left side and the right side of the machine which are used to propel the machine. In general, each track assembly may include a number of track links that are connected to shoes. The track links are connected to one another to form an endless or closed track assembly. On each side of the machine a sprocket that is driven to rotate by an engine of the machine engages the track assembly to translate the track assembly about spaced-apart pulley mechanisms. As the track links translate about the pulley mechanisms, the shoes that are connected to the track links engage a ground surface under the machine to transmit torque from the sprockets to the ground surface in a direction opposite the desired travel direction of the machine, thereby propelling the machine.

Each track assembly also includes track pins that are used to connect the track links to one another, forming the track assembly. Connections between the track pins and the track links must be sufficient to retain the pins within the links during operation of the machine on the ground surface. Otherwise, the track assemblies may fail as a result of the tracks links becoming disconnected from one another. The loads the connections must withstand depend on numerous factors, such as a weight of the machine, a size or a material of the track links, a size or a material of the track pins, an environment in which the machine is operating, characteristics of the ground surface engaged by the shoes, or other factors.

U.S. Pat. No. 6,280,173 to Hashimoto et al. is directed to various connections between track links and track pins. In the Hashimoto patent, either the track links or the track pins are plastically deformed, to form intermittent, spaced-apart projections connecting the links and pins. The Hashimoto patent suffers from numerous disadvantages, however. For example, in the Hashimoto patent a tool is used to apply an axial force simultaneously to a plurality of locations on either the link or the pins, so that the intermittent projections are formed at the same time. Thus, a press necessary to apply a relatively high force must be used to apply the axial force to the tool. The life of the press, as well as that of the tool, may be relatively short as a result of the cyclic application of these high forces. Further, it may be expensive to repair or replace the press or tool capable of applying the high forces.

The disclosed system and method of retaining a track pin within a track link may overcome one or more of the disadvantages set forth above, or other disadvantages of other known systems or methods.

SUMMARY

The disclosure may provide a method of forming a track assembly. A track pin may be disposed within a first through hole of a first track link and within a second through hole of a second track link. A force may be applied to a tool positioned in a first position to plastically deform a first portion of the first track link which surrounds the first through hole, to thereby form a first connection between the track pin and the first track link. A force may also be applied to the tool positioned in a second position to plastically deform a second portion of the first track link which surrounds the first through hole, to thereby form a second connection between the track pin and the first track link. The second connection may be formed after the first connection.

The disclosure may further provide a method of forming an endless track assembly for a mobile machine. A first track link and a second track link may be disposed in a fixture such that axes of through holes formed in the first and second track links are approximately co-linear and parallel. A track pin may be disposed within the through holes such that an interference fit is achieved between the pin and the through hole in the first track link. An end face of the track pin may be aligned with an end face of a boss that surrounds the through hole in the first track link, such that the end faces are approximately coplanar. A force may be applied to a tool positioned in a first position to plastically deform a first portion of the boss, to thereby flow material from the boss into a channel of the track pin to form a first connection between the track pin and the first track link. A force may also be applied to the tool positioned in a second position to plastically deform a second portion of the boss, to thereby flow material from the boss into the channel to form a second connection between the track pin and the first track link.

DETAILED DESCRIPTION

Figure 1:
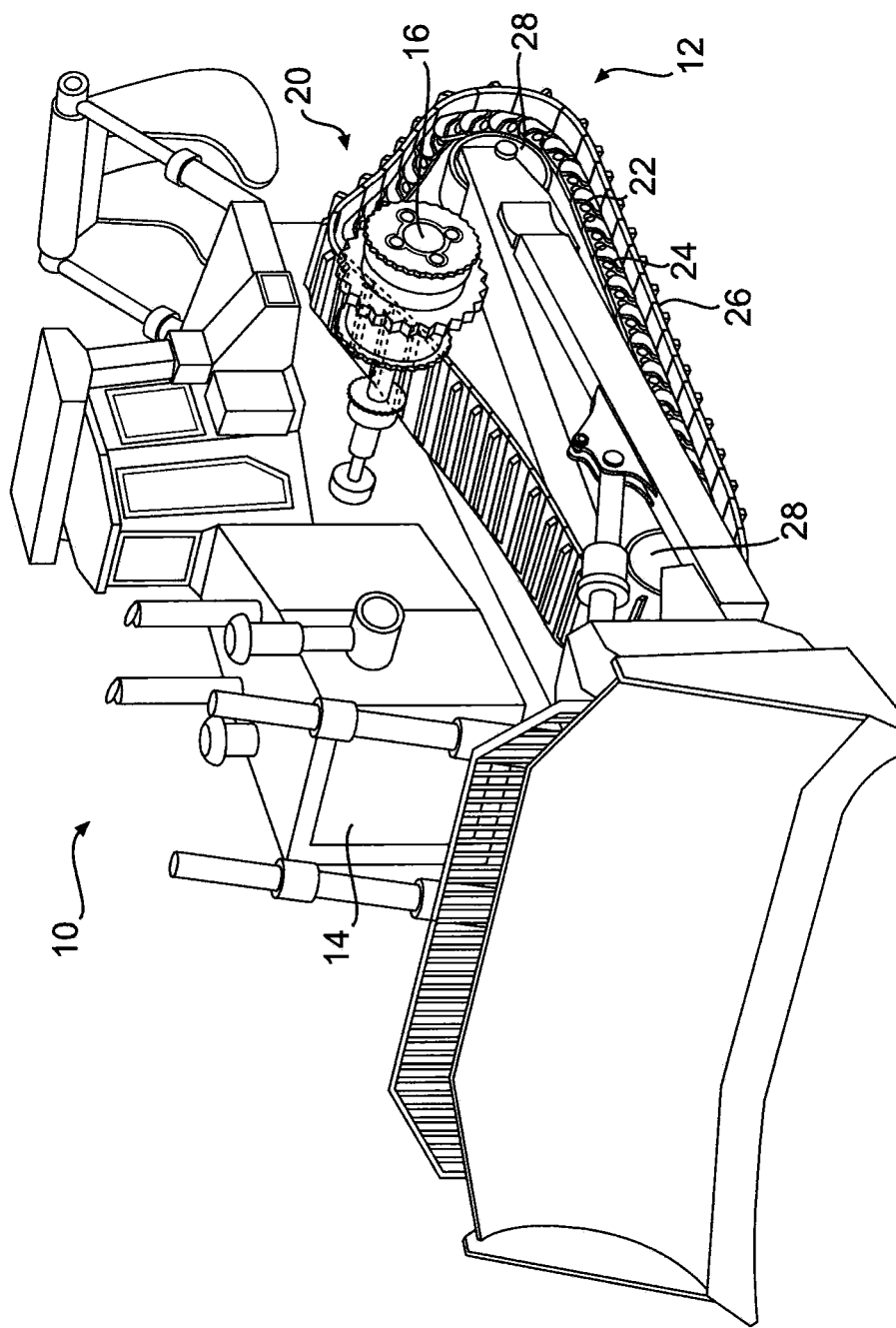
FIG. 1 is a pictorial illustration of an exemplary disclosed mobile machine.

FIG. 1 illustrates a track-type mobile machine 10 having a tracked undercarriage 12 that is driven by a power source 14. Machine 10 may be any type of machine that performs an operation associated with an industry such as mining, excavation, construction, farming, or any other industry. For example, machine 10 may be an earth-moving machine such as a bulldozer, a loader, an excavator, or any other type of earth-moving machine. Machine 10 is not limited to being an earth-moving machine, however, and may be any machine that includes a track, such as a cold planar, a pipelayer, a tractor, a harvester, or another machine.

Power source 14 may drive tracked undercarriage 12 of machine 10 at a range of output speeds or torque. Power source 14 may be an engine such as, for example, a diesel engine, a gasoline engine, a gaseous fuel-powered engine, or any other type of engine. Power source 14 alternately may be a non-combustion source of power such as, for example, a fuel cell, a power storage device, or any other source of power. Thus, power source 14 is not limited to any particular type of power source. Consistent with the disclosure, power source 14 may be entirely omitted from machine 10, such as, for example, when machine 10 is a trailer that is pulled by another machine.

A sprocket 16 may be disposed on each side of machine 10. Each sprocket 16 may be rotationally-driven by power source 14. A track assembly 20 also may be disposed on each side of machine 10. Each track assembly 20 may include a plurality of track links 22 that are connected to one another by track pin assemblies 24. Shoes 26, which are configured to engage a ground surface under machine 10, may be connected to tracks link 22. Each of the track assemblies 20 may form a closed loop, and each closed loop may be supported by two pulley mechanisms 28 that are spaced apart from one another on one side of machine 10. By this arrangement, sprockets 16 that are rotated by power source 14 may engage and transmit torque to track pin assemblies 24, resulting in movement of track assemblies 20 around the two sets of pulley mechanisms 28.

Figure 2:
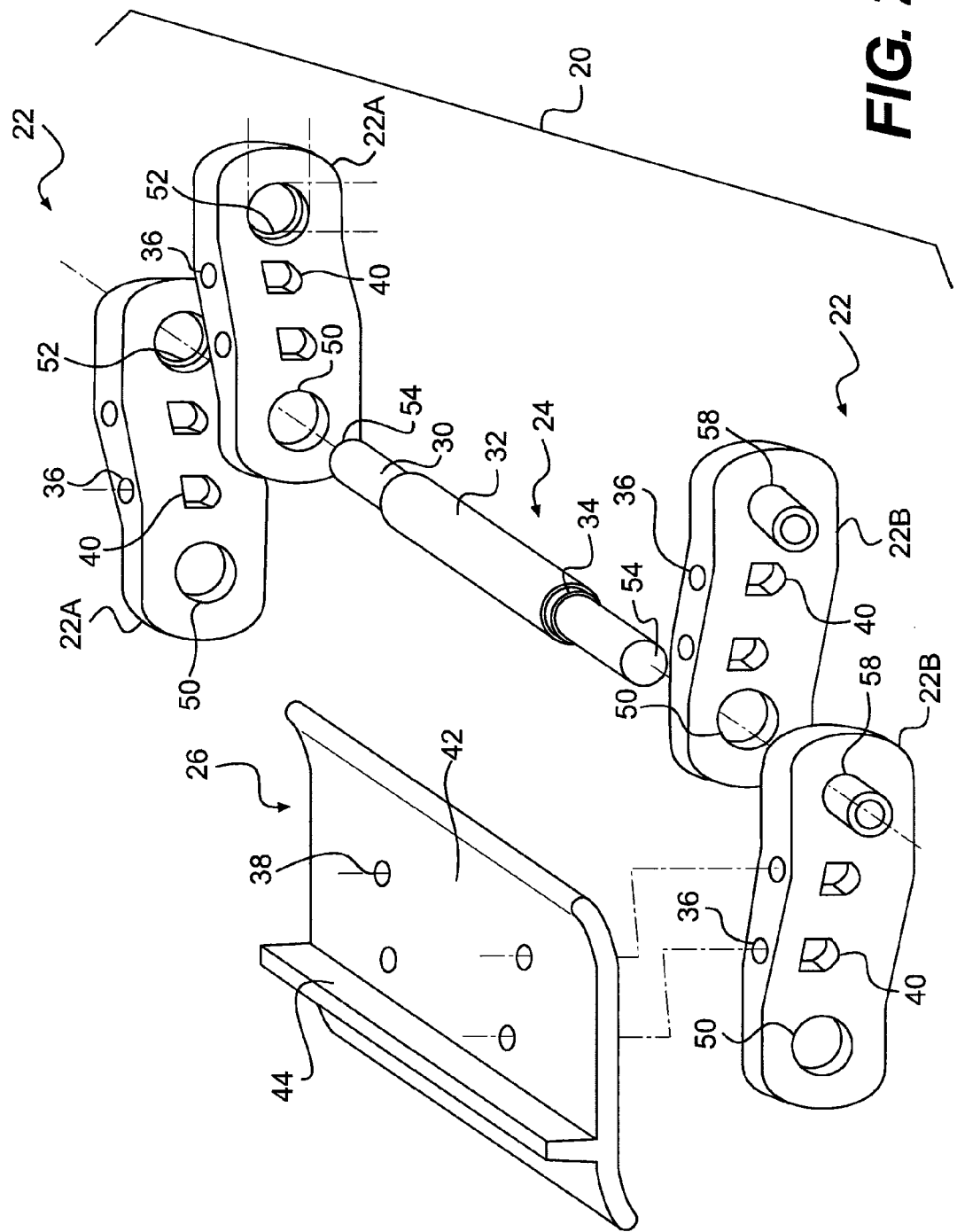
FIG. 2 is an exploded illustration of a track assembly of the mobile machine of FIG. 1.

FIG. 2 illustrates a portion of one of the track assemblies 20 which includes four track links 22, one track pin assembly 24, and one shoe 26. As shown in FIG. 2, track links 22 may include track links 22a and track links 22b. Track links 22a and 22b may be mirror images of each other, and may be disposed opposite one another within track assembly 20, such that track links 22a form one side of track assembly 20, while track links 22b form the opposite side of track assembly 20. When the components shown in FIG. 2 are assembled with one another, one track pin assembly 24 may be used to connect four track links 22 (e.g., two track links 22a and two track links 22b), one shoe 26 may be connected to one track link 22a and one track link 22b, and another shoe 26 (not shown) may be connected to the other track link 22a and the other track link 22b. Although the figures show specific examples of track links 22, the disclosure is not limited to a system or a method that includes track links 22a, 22b as illustrated in FIG. 2. Instead, the disclosed track pin retention system and method may be used with any type of track link that forms a track assembly usable by a track-type mobile machine.

As shown in FIG. 2, each track pin assembly 24 that connects track links 22 may include a track pin 30, a bushing 32, and at least one retention ring 34. Bushing 32 may be disposed on track pin 30, such that bushing 32 rotates relative to track pin 30. By this arrangement, rotationally-driven sprocket 16 (FIG. 1) may engage bushing 32, and bushing 32 may rotate on track pin 30 with sprocket 16. As a result of the force applied to bushing 32, track pin 30 may translate, resulting in movement of track assembly 20 around pulley mechanisms 28 (FIG. 1), as described above, to move the machine on the ground surface.

Retention ring 34 may be disposed on one side of track pin 30, so as to act as a stop that positions bushing 32 on track pin 30 when bushing 32 contacts retention ring 34. Consistent with the disclosure, two retention rings 34, one on each end of track pin 30, may be used to position and retain bushing 32 on track pin 30. Alternately, retention ring 34 may be omitted entirely from track pin assembly 24. In this arrangement, bushing 32 may be retained on track pin 30 by the two links 22 (e.g., one track link 22a and one track link 22b) that are disposed on either side of bushing 32.

Each track link 22a and 22b may include one or more through holes 36, while each shoe 26 may include corresponding through holes 38. Each track link 22a and 22b may also include one or more openings 40 aligned with through holes 36. By this arrangement, threaded fasteners such as bolts (not shown) may be disposed within through holes 36 and 38 to attach shoes 26 to track links 22a and 22b, and corresponding threaded fasteners such as nuts (not shown) may be disposed on the ends of the bolts. Openings 40 may be formed to facilitate placement or tightening of the nuts on the ends of the bolts, such as by being sized, shaped, or located to accommodate a tool that may be used to tighten the nuts.

Each shoe 26 may include a substantially rectangular planar base 42 forming a ground-engaging surface. Shoe 26 may also include a grouser 44 extending outwardly from planar base 42. Grouser 44 may increase the traction of track assemblies 20 on the ground surface under the machine. Although FIG. 2 shows shoe 26 including a single grouser, shoe 26 is not limited to one grouser 44. For example, each shoe 26 may include a plurality of grousers 44, such as three grousers 44. Further, although FIG. 2 shows grouser 44 in the shape of a bar with a rectangular cross section, grouser 44 is not limited to this shape. For example, grouser 44 may be a plurality of bars, one or more spikes, one or more curves, or combinations of these or different shapes. Grousers 44 may be permanently attached to shoes 26, such as by welding, or may be removably attached, such as by being bolted, to shoes 26 for ease of replacement.

Although FIG. 2 shows a specific example of shoe 26, the disclosed embodiments are not limited to a system or a method that includes shoes 26. Instead, the disclosed embodiments may be used with any type of shoe forming a part of a track assembly used by a track-type mobile machine. Alternately, shoes may be omitted entirely from track assemblies 20, so that surfaces of track links 22a, 22b that would otherwise contact shoes 26 may contact the ground surface under the machine. [0021] Each of track links 22a and 22b may define a plurality of additional through holes configured to accept at least a portion of track pin assemblies 24. For example, each track link 22a and 22b may include a through hole 50 formed on one end of the track link. Each through hole 50 may be configured to receive a portion of track pin 30 and be disposed proximate and/or in contact with an end face of bushing 32 or an end face of retaining ring 34, when track assembly 20 is assembled. When track assembly 20 is assembled, track pin assembly 24 may rotate within or relative to through hole 50. Thus, a diameter of through hole 50 may be greater than a diameter of the portion of track pin 30 disposed within through hole 50. A bearing set (not shown), such as a roller bearing assembly, may be disposed within through hole 50 and/or on the portion of track pin assembly 24 that is disposed within through hole 50.

Each of track links 22a and 22b may also include a through hole 52, which is formed on an end of the track link that is opposite the end on which through hole 50 is formed. Each through hole 52 may be configured to receive a portion of track pin 30 that is proximate a free end 54 of track pin 30. When track assembly 20 is assembled, track pin 30 of track pin assembly 24 may be prevented from rotating within or relative to through holes 52 of the two track links 22a and 22b that track pin 30 connects, although bushing 32 disposed on track pin 30 may be permitted to rotate relative to track links 22a and 22b and track pin 30. For example, both of the free ends 54 of each track pin 30 may be connected to material of track links 22a and 22b which surrounds through holes 52. Connections between track pins 30 and the material surrounding through holes 52 may be formed by sizing a diameter of each through hole 52 to be approximately a same size as or slightly smaller than a diameter of free end 54 of track pin 30 that is disposed within through hole 52. By this arrangement, an interference fit may be achieved between track pin 30 and the material of track links 22a and 22b which surrounds through hole 52. Consistent with the disclosure, this connection between track pin 30 and track links 22a and 22b may be omitted from each of track assemblies 20.

Each track link 22a and 22b may include a boss 58 that surrounds each of the two through holes 52. Each boss 58 may be used to form another connection with free end 54 of track pin 30. These connections may be in addition to or in place of the above-discussed interference fits. An axis of boss 58 may be approximately co-linear and approximately parallel to an axis of through hole 52 that is surrounded by boss 58. Thus, when track pin 30 is inserted in through hole 52, the axis of track pin 30 may be approximately co-linear and approximately parallel to the axes of boss 58 and/or through hole 52. This connection is discussed in detail below, with reference to FIG. 4.

Figure 3:
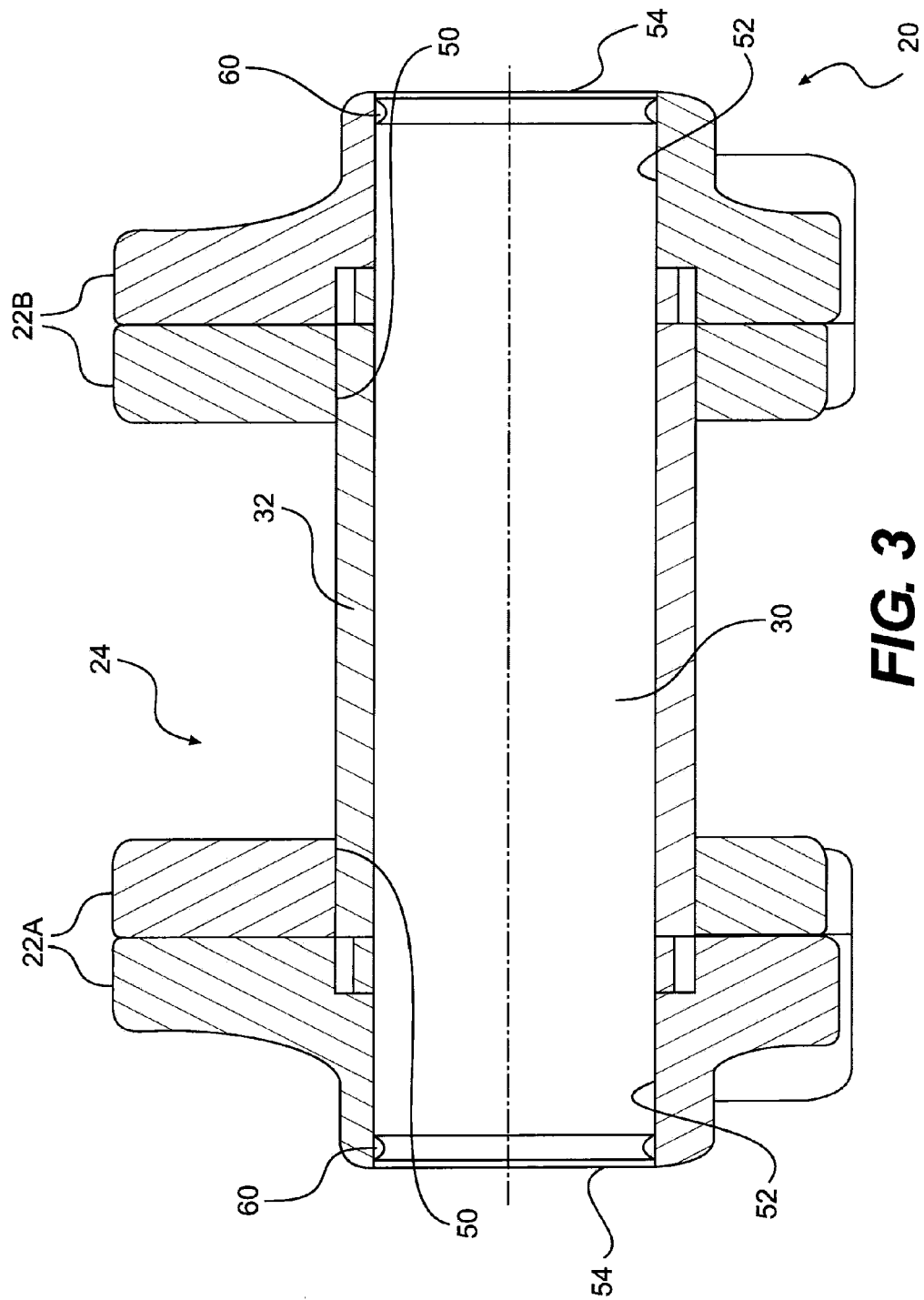
FIG. 3 is a cross-sectional view of the track assembly of the mobile machine of FIG. 1.

FIG. 3 shows a cross-sectional view of a portion of track assembly 20. As shown in FIG. 3, when track assembly 20 is assembled, track pin assembly 24 may be disposed within through holes 50 and 52 of track links 22a and 22b. End faces of free ends 54 of track pin 30 on which bushing 32 rotates, may be approximately co-planar with end faces of bosses 58. Each track pin 30 may include two channels 60 or other voids, one proximate each free end 54 of track pin 30, which are used in the formation of the connections between bosses 58 and track pin 30. In accordance with the disclosure, a shape of each channel 60 may be semi-circular in cross section, or channels 60 may have another shape. Alternately, channels 60 may be omitted entirely from one or both ends of each track pin 30. Each channel 60 may be continuous (e.g., surrounding approximately and entire circumference of track pin 30) or intermittent.

INDUSTRIAL APPLICABILITY

Figure 4:
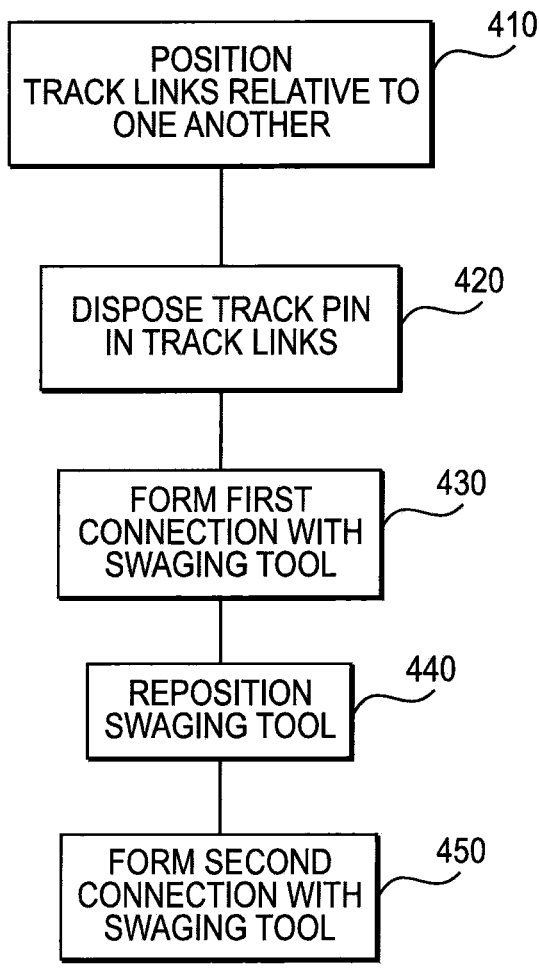
FIG. 4 illustrates an exemplary method of retaining a track pin within a track link of a track assembly, consistent with the disclosure.

The disclosed track pin retention system and method may be applicable to any machine having a track assembly that includes track links connected by the track pins. The following discussion, with reference to FIG. 4, provides an exemplary process for assembly of the track links with the track pins, which may form connections sufficient to retain the pins within the links during operation of the machine on a ground surface. These connections may be used when interference fits between the track pins and the track links are not sufficient to retain the pins within the links, or when interference fits are omitted.

As shown in Step 410, two track links 22 may be positioned relative to one another. For example, two track links of a same type (e.g., either two track links 22a or two track links 22b) may be positioned in a fixture. Specifically, the track links may be held such that surfaces of track links 22 on which shoes 26 are to be installed face a same direction (e.g., either both facing up or both facing down). The two track links 22 may also be positioned in the fixture such that through hole 50 of one of the track links 22 is adjacent to and aligned with through hole 52 of the other track link 22, and such that boss 58 surrounding through hole 52 is outside of the track link 22 that includes through hole 50. Through holes 50 and 52 may be aligned by aligning the axes of through holes 50 and 52 approximately parallel and approximately co-linear with each other.

As shown in Step 420, track pin 30 may be disposed within through holes 50 and 52 that are aligned with one another. In accordance with the above discussion, the diameter of through hole 50 may be oversized relative to the diameter of the portion of track pin 30 disposed within through hole 50, such that track pin 30 may rotate relative to through hole 50. When through hole 50 is to include a bearing set, the bearing set may be disposed on track pin 30 or within through hole 50 prior to or after insertion of track pin 30 in through hole 50. As discussed above, the bearing set may be omitted entirely from track assembly 20. Other components of track pin assembly 24, such as bushing 32 and retention ring 34, may be disposed on track pin 30 prior to or after insertion of track pin 30 within through hole 50. Regardless of when it is disposed on track pin 30, bushing 32 may rotate relative to track pin 30 and through hole 50 even after assembly is complete. During this step, the end face of free end 54 of track pin 30 may be aligned approximately co-planar with an end face of boss 58 surrounding through hole 52.

As discussed above, the diameter of through hole 52 may be approximately the same as or slightly smaller than the diameter of the portion of track pin 30 disposed within through hole 52. Thus, an interference fit may be achieved between free end 54 of track pin 30 and the material surrounding through hole 52. This interference fit may prevent rotation of track pin 30 relative to through hole 52. In accordance with the present disclosure, an interference fit need not be achieved between through hole 52 and track pin 30.

As shown in Step 430, a first connection may be formed between track pin 30 and boss 58 at a first location on a circumference of boss 58. For example, at least a portion of the material of boss 58 may be plastically deformed to form a connection with track pin 30. The plastic deformation of boss 58 may be accomplished through orbital swaging of boss 58. Specifically, a swaging tool may be oriented such that an axis of the swaging tool is disposed at a non-zero degree angle relative to the axes of track pin 30 and boss 58 (e.g., so that an axis of the swaging tool is not parallel with an axis of track pin 30, an axis of through hole 52, and/or an axis of boss 58), which as discussed above are approximately co-linear and approximately parallel. The non-zero angle may be between approximately 5 degrees and 10 degrees, or may be any other angle.

The swaging tool may be positioned at a first position relative to the circumference of boss 58. A press may be used to apply a force to the swaging tool to plastically deform material of boss 58 at the first location on boss 58, thereby forming the first connection between boss 58 and track pin 30. As stated above, free end 54 of track pin 30 may include channel 60 into which the material of boss 58 is deformed and flows during formation of this connection. The material of boss 58 flowing into channel 60 may, but need not, be a lip or similar structure of boss 58.

Thus, in accordance with the disclosed embodiments, the force may be applied only to a relatively small area of boss 58, rather than being applied simultaneously to a plurality of locations of boss 58 as is done with known systems and in known methods. Therefore, the press applying the force to the swaging tool in accordance with the disclosed process need not be capable of applying a high force to the tool. As a result, the life of the press, as well as the life of the swaging tool, is much longer as compared to the press and the tool utilizing high forces.

As shown in Step 440, the swaging tool may be repositioned in a second position relative to the circumference of boss 58, for subsequent formation of a second connection between track pin 30 and boss 58 at a second location along the circumference of boss 58. For example, the swaging tool may be rotated around a rotational axis off of the tool itself, which is approximately co-linear and approximately parallel to the axis of boss 58, to the second position. During this rotation, the swaging tool may remain at approximately the same non-zero degree angle relative to the axis of boss 58. Alternately, the swaging tool may be reoriented at a different non-zero degree angle relative to the axis of boss 58.

As shown in Step 450, the second connection then may be formed between track pin 30 and boss 58 at the second location. For example, a different portion of the material of boss 58 may be plastically deformed to form the second connection with track pin 30. Similar to Step 430, the plastic deformation of boss 58 may be accomplished through orbital swaging of boss 58. The press may be used to apply a force to the swaging tool to plastically deform material of boss 58 at the second location, thereby forming the second connection between boss 58 and track pin 30. As stated above, free end 54 of track pin 30 may include channel 60 into which the material of boss 58 is deformed and flows during formation of this connection. Thus, the second connection may be formed at a different time than (e.g., not simultaneous with) the first connection.

Although not shown in FIG. 4, additional processes may be used to provide additional connections between track pin 30 and track links 22. For example, the swaging tool may continue to be repositioned at other positions, such that boss 58 is plastically deformed at a number of separate, discrete locations (e.g., 4 locations or 8 locations) along the circumference of boss 58. Alternately, boss 58 may be plastically deformed around approximately the entire circumference.

Further processes also may take place to attach other components of track assembly 20. For example, when Steps 410 through 450 are used to form a sub-assembly of two track links 22a connected with one track pin assembly 24, subsequent operations may connect other track links 22a to the sub-assembly. Alternatively or additionally, subsequent operations may connect track links 22b to the sub-assembly. Thus, additional track links 22a and 22b may be used, along with additional track pin assemblies 24, to form track assembly 20. Shoes 26 also may be installed on the track links 22.

It will be apparent to those skilled in the art that various modifications and variations can be made to the disclosed track pin retention system and method. Other embodiments will be apparent to those skilled in the art from consideration of the specification and practice of the disclosed systems and method. It is intended that the specification and examples be considered as exemplary only, with a true scope being indicated by the following claims and their equivalents.

What is claimed is:

1. A method of forming a track assembly, comprising:
    disposing a track pin within a first through hole of a first track link and within a second through hole of a second track link;
    applying a force to a swaging tool positioned in a first position to plastically deform a first portion of the first track link which surrounds the first through hole, to thereby form a first connection between the track pin and the first track link;
    repositioning the swaging tool form the first position to a second position; and
    applying a force to the swaging tool positioned in the second position to plastically deform a second portion of the first track link which surrounds the first through hole, to thereby form a second connection between the track pin and the first track link, the second connection being formed after the first connection.

2. The method of claim 1, wherein the track pin includes a channel, and
    wherein applying the force to the swaging tool positioned in the first position results in material of the first track link flowing into the channel.

3. The method of claim 1, wherein applying the force to the swaging tool positioned in the first position includes using a press to apply the force to the tool.

4. The method of claim 1, further including:
    rotating the swaging tool about an axis to position the tool in the second position.

5. The method of claim 1, further including:
    rotating the swaging tool about a rotational axis off of the tool which is approximately parallel to an axis of the first through hole, to thereby position the swaging tool in the second position.

6. The method of claim 1, further including:
    applying forces to the swaging tool positioned in additional positions to plastically deform additional portions of the first track link which surround the first through hole, to thereby form additional connections between the track pin and the first track link.

7. The method of claim 1, further including:
    repositioning the swaging tool and applying forces to the swaging tool to plastically deform the first track link around approximately an entire circumference of the track pin.

8. A method of forming an endless track assembly for a mobile machine, comprising:
    disposing a first track link and a second track link in a fixture such that axes of through holes formed in the first and second track links are approximately co-linear and parallel; disposing a track pin within the through holes such that an interference fit is achieved between the pin and the through hole in the first track link;
    aligning an end face of the track pin with an end face of a boss that surrounds the through hole in the first track link, such that the end faces are approximately coplanar;
    applying a force to a swaging tool positioned in a first position to plastically deform a first portion of the boss, to thereby flow material from the boss into a channel of the track pin to form a first connection between the track pin and the first track link;
    repositioning the swaging tool from the first position to a second position; and
    applying a force to the swaging tool positioned in the second position to plastically deform a second portion of the boss, to thereby flow material from the boss into the channel to form a second connection between the track pin and the first track link.

9. The method of claim 8, wherein applying the force to the swaging tool positioned in the first position includes using a press to apply the force to an orbital swaging tool.

10. The method of claim 8, further including:
    rotating the tool about an axis to position the swaging tool in the second position.

11. The method of claim 8, further including:
    rotating the swaging tool about a rotational axis off of the tool which is approximately parallel to an axis of the boss, to thereby position the swaging tool in the second position.

12. The method of claim 8, further including:
    rotating the swaging tool about a rotational axis off of the swaging tool which is approximately parallel to the axis of the boss, while maintaining the swaging tool at a non-zero degree angle, to thereby position the swaging tool in the second position.

13. The method of claim 8, further including:
    applying forces to the swaging tool in a number of position to plastically deform other portions of the boss, to thereby form additional connections between the track pin and the first track link.

14. The method of claim 8, further including:
    applying forces to the swaging tool to plastically deform the boss around an entire circumference of the track pin.

15. The method of claim 8, further including
    applying forces to the tool to plastically deform the boss around less than an entire circumference of the track pin.

* * * * *